Sept. 15, 1959      B. B. KORN      2,904,143
LOCKING APPARATUS
Filed Feb. 7, 1956      2 Sheets-Sheet 1
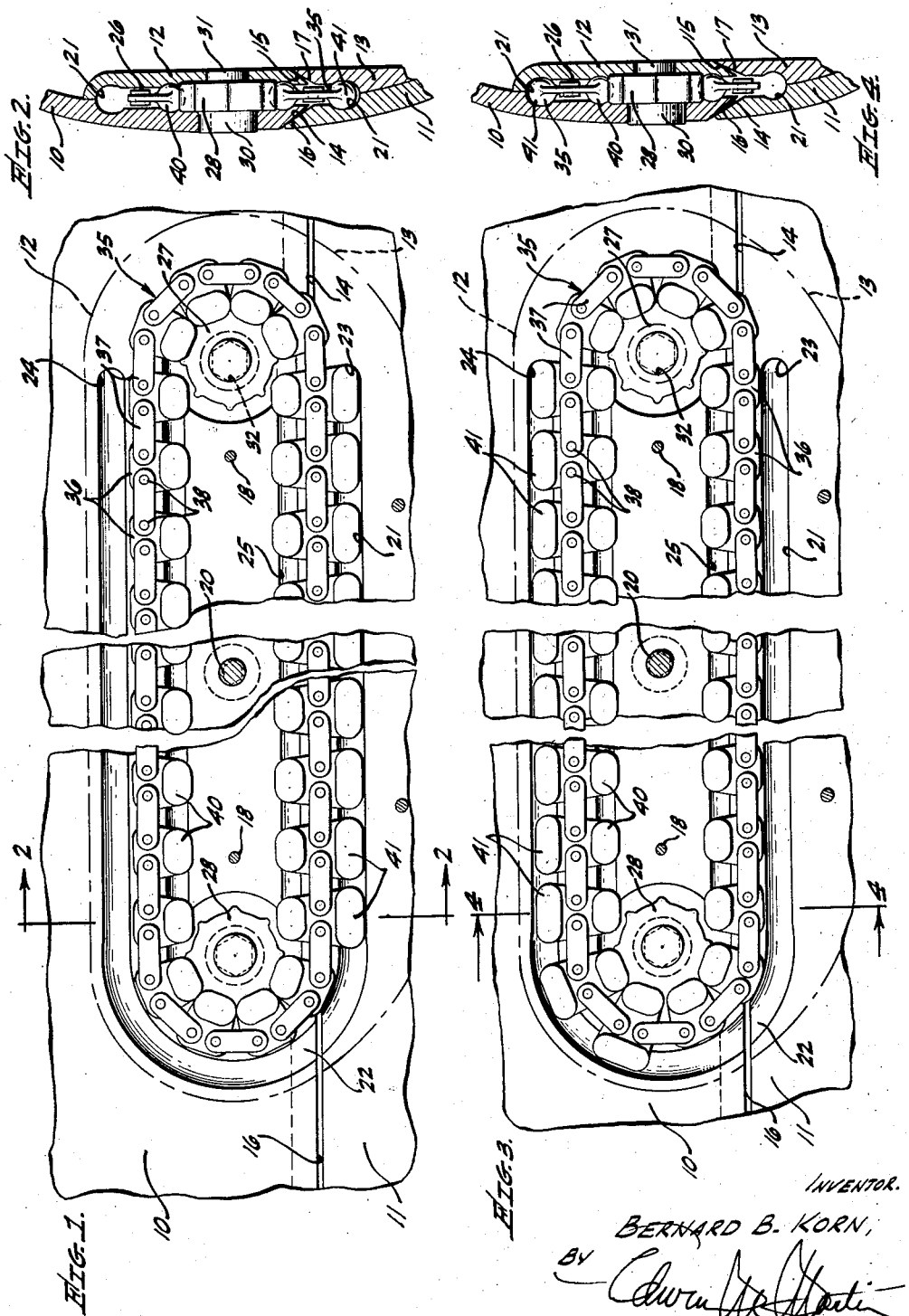
INVENTOR.
BERNARD B. KORN,
BY
ATTORNEY.

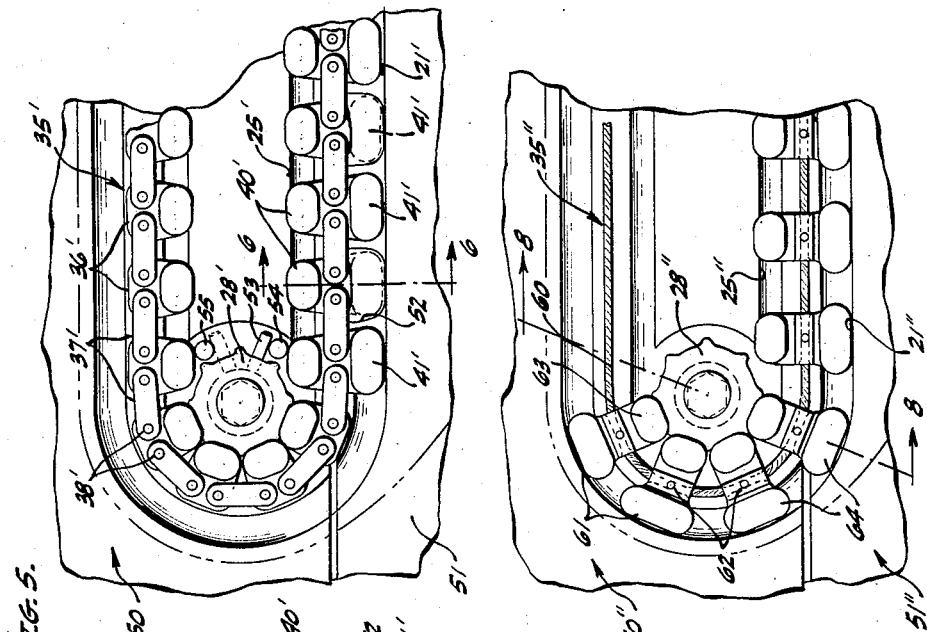
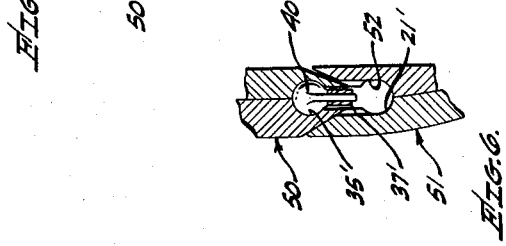
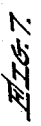
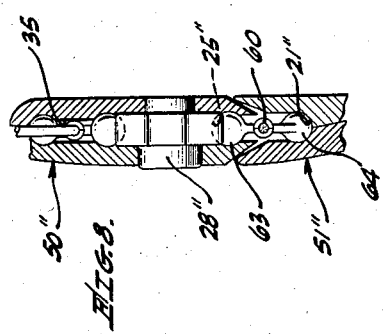

United States Patent Office 2,904,143
Patented Sept. 15, 1959

2,904,143

LOCKING APPARATUS

Bernard B. Korn, Los Angeles, Calif., assignor to Hughes Aircraft Company, Culver City, Calif., a corporation of Delaware Application February 7, 1956, Serial No. 564,021

9 Claims. (Cl. 189—36)

This invention relates generally to a locking device and relates more particularly to such a device that is capable of locking edge joined sheets of material, one with the other.

In the joining of sheet metal parts along edged seams, it has heretofore been a problem to provide tight locked engagement all along such a seam, especially in instances where relatively long joints are required such as, for example, in aircraft access doors, removable panels, etc., necessitating frequent opening or removal thereof. In prior devices designed for similar purposes, it has been common to employ a plurality of fasteners such as, for example, screws, bolts, multiple clips, or the like, which not only require considerable time and effort for the installation and removal thereof, but fail to provide a continuous locking arrangement along the entire joined material edges. Furthermore, under tensile loaded conditions, it has heretofore been difficult, and in some cases impossible, to maintain edge joined sheets of material in conditions of tight contact and perfect alignment due to the loading forces thereon. For example, in aircraft exterior access doors or panels, many loading factors are encountered, during operation of the aircraft, and the necessity for positive latching of these doors or panels along an entire joint or splice may readily be understood.

It is, accordingly, one important object of this invention to provide a novel continuous lock arrangement for edged joined sheets of material.

It is another important object of this invention to provide a locking apparatus for edge joined sheets of material wherein locking and unlocking may be accomplished rapidly even though a joint may be relatively long and tensile loading may be required.

A further important object of this invention is to provide a locking apparatus for edge joined sheets of material including an endless locking structure carried by one of the sheets of material and cooperable with a locking groove provided in the other of the sheets of material.

A still further important object of this invention is to provide a novel means for supporting and actuating a continuous locking arrangement for edge joined sheets of material.

Still another object of the invention is to provide a sprocket carried endless chain arrangement employing a plurality of locking members operatively associated with the chain, forming link portions thereof and cooperable with a U-shaped groove extending across edges of joined sheets of relatively thin sheet material.

A further important object of the present invention is to provide a locking apparatus, for edge joined sheets of material, that is simple in construction, reliable and effective in operation and use, and which may be adapted for application to the latching or locking together of edge joined sheets of relatively thin material.

Other and further important objects of this invention will become apparent from the disclosures in the following detail specification, appended claims and accompanying drawings, wherein:

Figure 1 is an elevation view, partially in section, showing one form of locking apparatus of the present invention with components thereof in a locked position;

Fig. 2 is a sectional view of a portion of the locking apparatus, as taken substantially as indicated by line 2—2, Fig. 1;

Fig. 3 is an elevation view, similar to Fig. 1, with the components of the locking apparatus shown in an unlocked position;

Fig. 4 is a sectional view similar to Fig. 2, as taken substantially as indicated by line 4—4, Fig. 3;

Fig. 5 is a fragmentary elevation view, similar to Fig. 1, showing a modified form of the present locking apparatus;

Fig. 6 is a fragmentary section view taken substantially as indicated by line 6—6, Fig. 5;

Fig. 7 is a fragmentary elevation view, similar to Fig. 5, showing a further modified form of the present locking apparatus; and Fig. 8 is a sectional view taken substantially as indicated by line 8—8, Fig. 7.

With reference to the drawings, the locking apparatus of the present invention is adapted for use particularly with a pair of edge joined sheets of material indicated generally at 10 and 11. As shown in Fig. 2, each of the sheets 10 and 11 are backed by means of doublers 12 and 13, respectively, there being a beveled edge 14 formed on the sheet of material 11 and a beveled edge 15 formed on the doubler 13, whereby to define an elongated V-shaped groove along the edge of the assembly unit. The sheet of material 10 is beveled as at 16 and the doubler 12 is beveled as at 17 in a manner complimentary to the bevels 14 and 15, whereby to provide an elongated V-shaped edge that is cooperable with the groove defined by the edges 14 and 15 to establish alignment between edges of the sheets 10 and 11. The doublers 12 may be secured to the sheet of material 10 by means of pins 18 and a centrally disposed screw arrangement 20, or by any other suitable means such as, for example, spot welding, or the like. Likewise, the doubler 13 may be secured in any suitable manner to the sheet of material 11.

With reference to Fig. 1, a generally U-shaped groove 21 is provided between the adjacent surfaces of the sheets 10 and 11 and associated doublers 12 and 13. The groove 21 defines a track that is generally circular in cross section, extends across the edges of the sheets 10 and 11 as at 22 and is provided with ends 23 and 24 respectively in the sheets 10 and 11. The groove 21 may be defined as an outer groove, there being an inner continuous groove 25 formed between the sheets of material and associated doublers, and an open web section 26 laterally interconnecting the grooves 21 and 25.

The sheet of material 10, together with its associated doubler 12, is adapted rotatably to support a pair of sprockets 27 and 28, each of which has an enlarged hub portion 30, journalled in the sheet of material 10, and a reduced diameter hub portion 31 journalled in the doubler 12. The hub portions 30 extend to an outer surface of the sheet 10 and are provided with hexagonal recesses 32 for reception of an Allen type wrench, or the like.

The sprockets 27 and 28 are adapted movably to support a locking structure indicated generally at 35. The locking structure 35 is of the chain type in one form of the invention and includes primary links 36 and secondary links 37 that are pivotally joined together by means of pins 38. All of the primary links 36 are provided with inwardly extending bulbous chain guide portions 40 that are adapted for cooperation with the sprockets 27 and 28 and movably disposed in the inner groove 25. A portion of the primary links 36 are provided with outwardly extending bulbous locking portions 41 that are adapted to be movably positioned within the groove 21.

As shown primarily in Figs. 1 and 2, a locked condition is established as between the sheets of material 10 and 11 by rotation of either of the sprockets 27 or 28 to position the bulbous locking portions 41 of the primary links 36 within the portion of the groove 21 formed between the sheet 11 and its associated doubler 13. In this instance, one of the bulbous portions 41 is positioned in contact with the end 23 of the U-shaped groove 21, with the balance of the bulbous portions 41 being longitudinally aligned in the groove 21.

As shown primarily in Figs. 3 and 4, an unlocked condition is established by rotation of either of the sprockets 27 or 28 and movement of the bulbous portions 41 into the portion of the groove 21 formed between the sheet 10 and associated doubler 12. Thus, with the various components shown in Fig. 3, the assemblies comprising the sheets 10 and 11 and associated doublers 12 and 13 may be separated and thereafter rejoined as may be required by again positioning of the bulbous portions 41 in the portion of the groove or track 21 formed between the sheet 11 and doubler 13.

With reference primarily to the form of the invention shown in Figs. 5 and 6, wherein like components are indicated by single primed reference numerals, a locking structure 35' is suitably mounted on sprockets, one of which is indicated at 28' and carried by a sheet of material and associated doubler assembly unit 50. Another assembly unit 51 comprises the lower portion of the figure, there being a U-shaped groove, or track 21' formed therein. In this form of the invention, as shown primarily in Fig. 6, the track 21' is provided with a plurality of laterally extending cutouts 52. The bulbous portions 41' need only be moved between the positions shown in the solid lines in Fig. 5 and the positions shown by the dotted lines in this figure, in order to provide a separable arrangement for the units 50 and 51, the sides of the cutouts 52 permitting the bulbous portions to move laterally from the groove 21'. Additionally, the sprocket 28' may be provided with a laterally extending stop member 53 that is cooperable with a pair of stop pins 54 and 55, disposed from the unit 50, for limiting movement of the locking structure 35' in both directions. With further reference to the form of the invention shown in Figs. 5 and 6, it is to be noted that while only every other primary chain link 36' is provided with a bulbous locking portion 41', movement thereof need only be for a very short distance in order to enable locking thereof. This form of the invention is particularly adaptable for use in instances where specific locking points may be spaced further apart along the length of the edge joined units 50 and 51 than would be permitted in situations employing the form of the invention of Figs. 1 and 4.

With reference to the form of the invention shown in Figs. 7 and 8, wherein like components are indicated by double primed reference numerals, it is to be noted that a locking structure indicated generally at 35" may include a cable 60 having primary links or locking members 61 spaced thereon and secured thereto by means of screws 62, or the like, engageable with the cable 60. In this form of the invention the members 61 have inner bulbous portions 63 that are cooperable with sprockets, one of which is indicated at 28", and outer bulbous portions 64 that are cooperable with a U-shaped groove 21" formed in edge joined assemblies 50" and 51". The operating characteristics of the form of the invention shown in Figs. 7 and 8 are substantially the same as those of the form of the invention shown in Fig. 1.

It may thus be seen that the various forms of the present invention provide a continuous locking arrangement for use with edge joined sheets of material, whereby a positive lock is provided continuously along the edges of such material, which may be opened or closed as desired. Additionally, the various components of the present device are relatively simple in construction, thus enabling precision, small and reliable manufacture thereof for association thereof with relatively thin sheets of material and associated cooperating doublers.

Having thus described the invention and the present several embodiments thereof, it is desired to emphasize the fact that many further modifications may be resorted to in a manner limited only by a just interpretation of the following claims.

What is claimed is:

1. A locking apparatus for a pair of sheets of material comprising, in combination: doublers connected to said sheets of material adjacent edges thereof; cooperating V-shaped edges formed on said sheets of material and said doublers; a circular in cross section U-shaped groove formed in adjacent surfaces of said doublers and said sheets of material, said groove extending across said V-shaped edges thereof; a pair of sprockets rotatably carried by one of said sheets of material and said doubler associated therewith; an endless chain having links and mounted on said sprockets; a plurality of bulbous locking members carried by a portion of said links of said chain; and a socket opening in at least one of said sprockets for permitting access thereto from without said sheets of material, whereby to rotate said sprockets and said chain from a locked position, with said locking members being disposed in a portion of said groove formed in the other of said sheets and associated doubler, to an unlocked position with said locking members disposed in a portion of said groove formed in said one of said sheets and associated doubler.

2. A locking appartus for a pair of sheets of material comprising, in combination: doublers connected to said sheets of material adjacent edges thereof; cooperating V-shaped edges formed on said sheets of material and said doublers; a circular in cross section outer U-shaped groove formed in adjacent surfaces of said doublers and said sheets of material, said groove extending across said V-shaped edges thereof; a pair of sprockets rotatably carried by one of said sheets of material and said doubler associated therewith; an endless chain having links and mounted on said sprockets; a plurality of bulbous locking members carried by a portion of said links of said chain; link guide portions carried by said portion of said links; inner groove means adapted for reception of said link guide portion and positioned between said sheets and said doublers; and a socket opening in at least one of said sprockets for permitting access thereto from without said sheets of material, whereby to rotate said sprockets and said chain from a locked position, with said locking members being disposed in a portion of said outer groove formed in the other of said sheets and associated doubler, to an unlocked position with said locking members disposed in a portion of said outer groove formed in said one of said sheets and associated doubler.

3. A locking apparatus for a pair of sheets of material comprising, in combination: doublers connected to said sheets of material adjacent edges thereof; cooperating V-shaped edges formed on said sheets of material and said doublers; a circular in cross section outer U-shaped groove formed in adjacent surfaces of said doublers and said sheets of material, said groove extending across said V-shaped edges thereof; a pair of sprockets rotatably carried by one of said sheets of material and said doubler associated therewith; an endless cable having links and mounted thereon and positioned about said sprockets; a plurality of bulbous locking members carried by a portion of said links of said chain; link guide portions carried by said portion of said links; inner groove means adapted for reception of said link guide portion and positioned between said sheets and said doublers; and a socket opening in at least one of said sprockets for permitting access thereto from without said sheets of material, whereby to rotate said sprockets and said chain from a locked position, with said locking members being disposed in a portion of said outer groove formed in the other of said sheets and associated doubler, to an unlocked position with said locking members disposed in a portion of said outer groove formed in said one of said sheets and associated doubler.

4. A locking apparatus for a pair of sheets of material comprising, in combination: doublers connected to said sheets of material adjacent edges thereof; cooperating V-shaped edges formed on said sheets of material and said doublers; a circular in cross section U-shaped groove formed in adjacent surfaces of said doublers and said sheets of material, said groove extending across said V-shaped edges thereof; a pair of sprockets rotatably carried by one of said sheets of material and said doubler associated therewith; an endless cable having links and mounted on said sprockets; a plurality of bulbous locking members carried by a portion of said links of said chain; means accessible through said one of said sheets of material to rotate at least one of said sprockets; a plurality of spaced cutouts in said U-shaped groove communicating between said groove and the V-shaped edge of another of said sheets of material and associated doubler, whereby, upon rotation of said at least one of said sprockets, to enable movement of said locking members from a locked position within said groove to an unlocked position within said cutouts; and means operatively associated with at least one of said sprockets for limiting rotational movement thereof and longitudinal movement of said chain and said locking members.

5. A locking apparatus for a pair of sheets of material comprising, in combination: doublers connected to said sheets of material adjacent edges thereof; cooperating V-shaped edges formed on said sheets of material and said doublers; a circular in cross section outer U-shaped groove formed in adjacent surfaces of said doublers and said sheets of material, said groove extending across said V-shaped edges thereof; a pair of sprockets rotatably carried by one of said sheets of material and said doubler associated therewith; an endless cable having links and mounted on said sprockets; a plurality of bulbous locking members carried by a portion of said links of said chain; link guide portions carried by said portion of said links; U-shaped inner groove means adapted for reception of said link guide portions and positioned between said sheets and said doublers; means accessible through said one of said sheets of material to rotate at least one of said sprockets; a plurality of spaced cutouts in said outer U-shaped groove communicating between this groove and the V-shaped edge of another of said sheets of material and associated doubler, whereby, upon rotation of said at least one of said sprockets, to enable movement of said locking members from a locked position within said outer groove to an unlocked position within said cutouts; and stop pin means operatively associated with one of said sprockets for limiting rotational movement thereof and longitudinal movement of said chain and said locking members.

6. A locking apparatus for edge joined objects comprising: a pair of rotatably mounted sprocket members carried by one of said objects and spaced longitudinally adjacent one edge of said one of said objects; a plurality of locking members disposed in spaced relationship; means for interconnecting said locking members in an endless flexible manner, said locking members being disposed about and interengaged with said sprockets; an elongated groove in each of said objects, said grooves being disposed substantially parallel to joined edges of said objects and connected across said edges at one complementary end thereof, said locking members being movable from said groove in one of said objects to said groove in the other to connect or disconnect said objects; and means for rotating at least one of said sprockets.

7. A locking apparatus for edge joined sheet objects comprising, in combination: a pair of rotatably mounted sprocket members carried by one of said objects, spaced longitudinally, positioned with axes normal to said objects and adjacent one edge of said one of said objects; an endless flexible locking structure having primary and secondary links, said primary links being disposed about and interengaged with said sprockets; a plurality of locking members carried by a portion of adjacently disposed primary links; an elongated groove in each of said objects, said grooves being disposed substantially parallel to joined edges of said objects and arcuately connected across said edges at one complementary end thereof, said locking members being movable from said groove in one of said objects to said groove in the other of said objects to connect or disconnect said objects; and means for rotating at least one of said sprockets.

8. A locking apparatus according to claim 7 wherein doublers are positioned adjacent edges of said sheet objects and said grooves are formed in opposed surfaces of said objects and said doublers.

9. A locking apparatus according to claim 8 wherein said rotating means for said one of said sprockets comprises a wrench socket formed in said one of said sprockets and accessible through said one of said sheet objects.

References Cited in the file of this patent

UNITED STATES PATENTS

| 124,102 | Whitney | Feb. 27, 1872 |
| 1,060,019 | Pederson | Apr. 29, 1913 |
| 1,543,930 | Lamphere | June 30, 1925 |
| 2,608,084 | Poulson | Aug. 26, 1952 |

FOREIGN PATENTS

| 15,992 | Great Britain | 1899 |